P. D. E. HUGUENIN.
INSTRUMENT FOR COPYING AND MEASURING CURVED OUTLINES.
APPLICATION FILED JULY 14, 1914.
1,141,640.
Patented June 1, 1915.
2 SHEETS—SHEET 1.
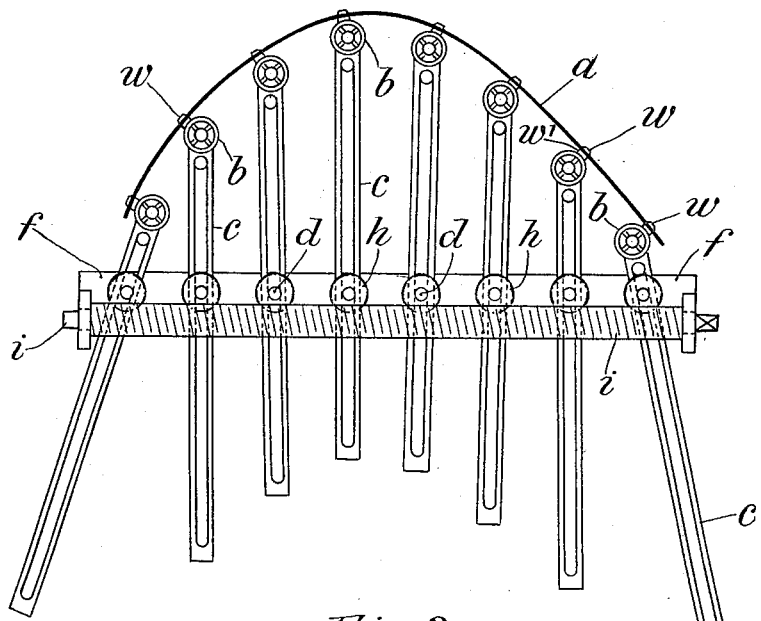
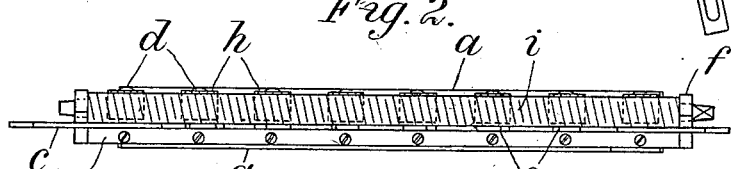
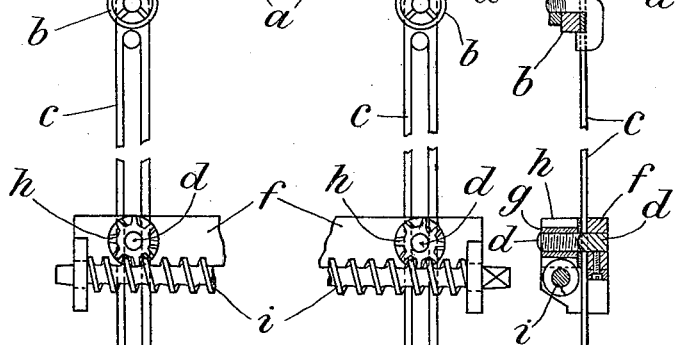

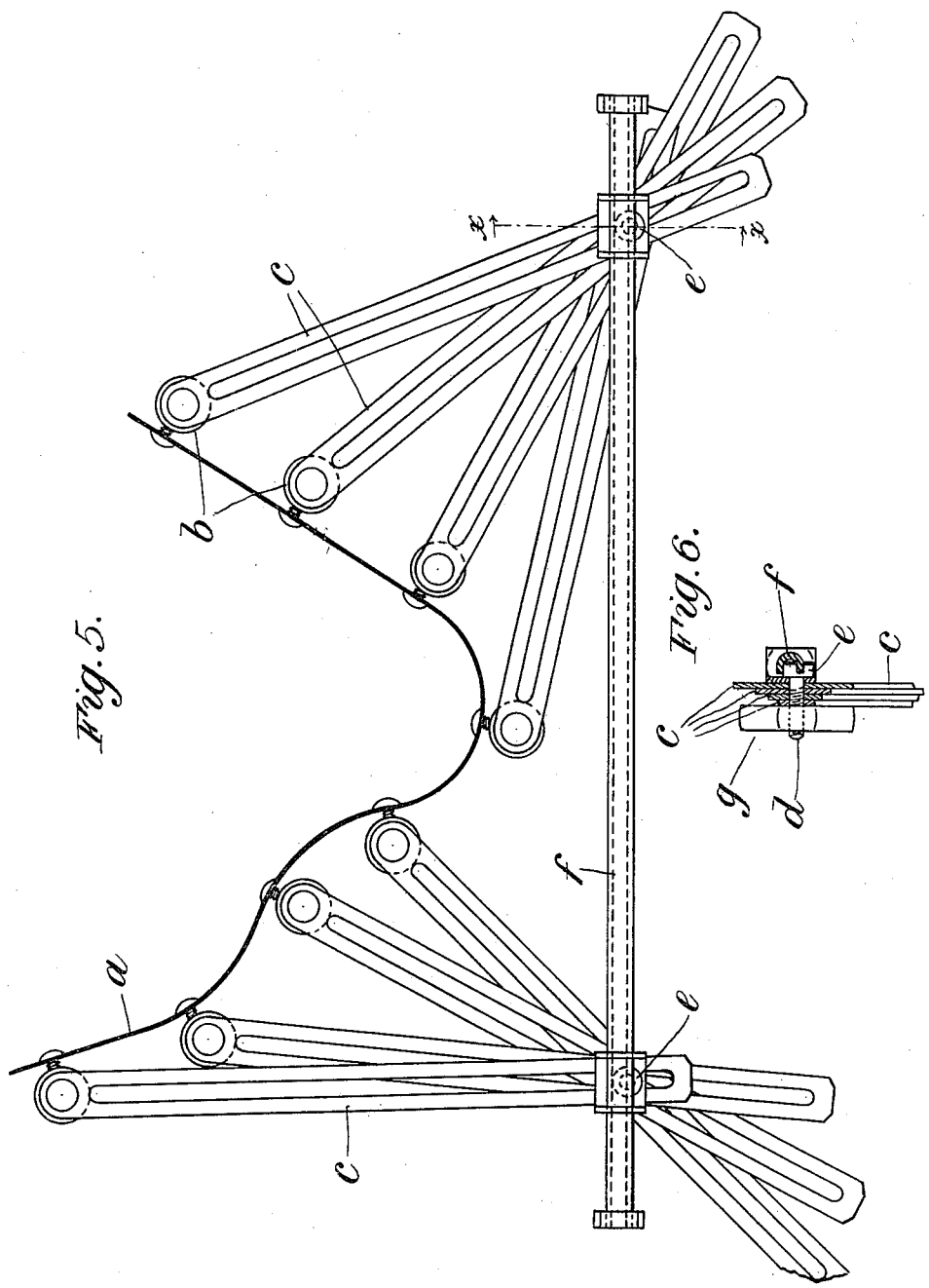

UNITED STATES PATENT OFFICE.

PAUL DANIEL EDOUARD HUGUENIN, OF LA TOUR-DE-PEILZ, SWITZERLAND.

INSTRUMENT FOR COPYING AND MEASURING CURVED OUTLINES.

1,141,640. Specification of Letters Patent. Patented June 1, 1915.

Application filed July 14, 1914. Serial No. 850,851.

*To all whom it may concern:*

Be it known that I, PAUL DANIEL EDOUARD HUGUENIN, artist-painter, a citizen of Switzerland, residing at La Tour-de-Peilz, canton of Vaud, in the Confederation of Switzerland, have invented certain new and useful Improvements in Instruments for Copying and Measuring Curved Outlines, of which the following is a specification.

The invention relates to an instrument of precision for reproducing and embodying with exactness any desired curve on a plane surface or in space. The instrument provides a means for copying a curve from a drawing or from a photograph even if only a certain number of points of the curve are given, and by it the curve may be reproduced, that is to be transferred to paper, wood or stone, or any piece of textile work either in the very same position as the original curve or in a symmetrical position. Furthermore the instrument is provided with a scale, whereby the length of a curve may be measured and whereby the relative position of any point in it, as for instance the relative position of the mouth or of the eye on the profile of a bust, may be suitably indicated. Several constructions of instruments of this class have already been used but the setting and adjusting of the parts for the practical use of the same have not been satisfactory.

The present invention relates to an instrument so constructed as to permit a rapid and accurate adjustment of the same into its working position.

In the drawing, Figure 1 is an illustration of a measuring instrument embodying my present invention. Fig. 2 is a plan view of the same. Fig. 3 is an elevation on an enlarged scale illustrating the manner in which the adjustable arms are connected to a rigid ruler and a flexible band pivoted to the adjustable arms. Fig. 4 is a cross section of an adjustable arm, and the parts associated therewith, taken at right angles to the position shown in Fig. 3. Fig. 5 is an illustration of a modified form of the invention, and Fig. 6 is a cross section on line $x$ $x$, Fig. 5 illustrating the manner in which the adjustable arms are connected to a ruler.

Referring to Figs. 1 to 4, $a$ represents a flexible hardened steel band used as the adjustable curve of the instrument and is provided with a scale. At equal distances from each other head pieces $b$ are fastened thereon by means of screws $w$, each head piece $b$ being hinged to a guiding-arm $c$ as shown in Figs. 1, 3 and 4. The guide arms $c$ are slotted substantially from end to end and may be adjusted to a rigid and straight ruler $f$ which is provided at equal distances from each with other fixed screws $d$, the nuts $h$ of which are shaped like a worm wheel. The worm wheel portions of the nuts $h$ all engage a common worm shaft $i$, operated by means of a hand-wheel or a crank fitting the squared end of it. With this construction therefore the nuts of the adjusting screws $d$ are all loosened or tightened at the same time by imparting but a few turns to the worm shaft $i$.

In the construction as shown in Fig. 5 and Fig. 6, the guide-arms $c$ are divided into two series, each of which is connected to the rigid ruler $f$ by means of but one slide $e$ provided with a screw $d$ and a screw-nut $g$ by means of which each series of arms $c$ may be firmly fixed at the desired point on the rigid ruler $f$, and in any desired position of the said arms $c$, corresponding to the different curves formed by the flexible steel band $a$. As will readily be seen in Fig. 5, every possible curve of the flexible steel-band $a$ may be secured when the two nuts $g$ have been loosened and when the said band $a$ has been placed in such a curve that the two series of guides $c$ are automatically placed in a certain position, in which they will be secured by merely tightening again the said two nuts $g$.

I claim as my invention.

1. An instrument for reproducing curved lines comprising a flexible band, guide arms hinged at their corresponding ends to said band, a rigid ruler, and means for simultaneously securing the said guide arms to said ruler after the position of the band has been determined.

2. An instrument for reproducing curved lines comprising a steel band, a plurality of slotted guide arms, to the corresponding ends of which the said steel band is hinged, a rigid straight ruler, a plurality of screws passing through the slots of said guide arms and secured to the said ruler and corresponding in number to the said guide arms, a nut on each of the said screws, each nut being provided with a worm wheel, and a screw shaft mounted in the said ruler and with which the worm wheels of the said nuts mesh so that all the said nuts may be turned simultaneously to tighten or loosen the said guide arms relatively to the said ruler.

In testimony whereof I have affixed my signature in presence of two witnesses.

PAUL DANIEL EDOUARD HUGUENIN.

Witnesses:
H. GOLAZ,
A. RIGASSI.

Copies of this patent may be obtained for five cents each, by addressing the "Commissioner of Patents, Washington, D. C."